(12) United States Patent
Yu et al.

(10) Patent No.: US 11,025,097 B2
(45) Date of Patent: Jun. 1, 2021

(54) WIRELESS CHARGING MANAGEMENT SYSTEM AND WIRELESS POWER TRANSMITTING TERMINAL

(71) Applicant: NINGBO WEIE ELECTRONICS TECHNOLOGY LTD., Zhejiang (CN)

(72) Inventors: Feng Yu, Zhejiang (CN); Weiyi Feng, Zhejiang (CN); Hengyi Su, Zhejiang (CN); Min Fu, Zhejiang (CN); Cong Yin, Zhejiang (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 193 days.

(21) Appl. No.: 16/033,968

(22) Filed: Jul. 12, 2018

(65) Prior Publication Data

US 2019/0067999 A1     Feb. 28, 2019

(30) Foreign Application Priority Data

May 15, 2017  (CN) .......................... 201710340208.1

(51) Int. Cl.
| | |
|---|---|
| *H02J 7/00* | (2006.01) |
| *H02J 7/14* | (2006.01) |
| *H02J 50/40* | (2016.01) |
| *H04W 24/08* | (2009.01) |
| *H02J 7/02* | (2016.01) |
| *H02J 50/90* | (2016.01) |
| *H02J 50/80* | (2016.01) |
| *H02J 50/12* | (2016.01) |
| *G06Q 30/04* | (2012.01) |

(Continued)

(52) U.S. Cl.
CPC .............. *H02J 50/40* (2016.02); *H02J 7/025* (2013.01); *H02J 50/12* (2016.02); *H02J 50/80* (2016.02); *H02J 50/90* (2016.02); *H04W 24/08* (2013.01); *G06Q 30/04* (2013.01); *H04B 5/0037* (2013.01); *H04L 67/42* (2013.01)

(58) Field of Classification Search
USPC ................................................. 320/108, 109
See application file for complete search history.

(56) References Cited

U.S. PATENT DOCUMENTS

| | | | | |
|---|---|---|---|---|
| 2012/0019057 | A9* | 1/2012 | Kirby ...................... | H02J 50/50 307/9.1 |
| 2012/0091950 | A1* | 4/2012 | Campanella ............ | H02J 50/50 320/108 |

(Continued)

FOREIGN PATENT DOCUMENTS

| | | |
|---|---|---|
| CN | 105391192 A | 3/2016 |
| CN | 106921218 A | 7/2017 |
| CN | 206727744 U | 12/2017 |

*Primary Examiner* — Alexis B Pacheco
(74) *Attorney, Agent, or Firm* — Andrus Intellectual Property Law, LLP

(57) ABSTRACT

A wireless charging management system and a wireless power transmitting terminal are disclosed. By managing a plurality of wireless power transmitting terminals distributed at different geographic positions through a server, the user can obtain position information and state information of the wireless power transmitting terminal through the client terminal, and at the meanwhile, the wireless power transmitting terminal can operate in response to the control of the server, which enables the user to use the wireless charging device in a shared manner conveniently.

14 Claims, 8 Drawing Sheets

(51) Int. Cl.
*H04L 29/06* (2006.01)
*H04B 5/00* (2006.01)

(56) References Cited

U.S. PATENT DOCUMENTS

| | | | |
|---|---|---|---|
| 2012/0112691 A1* | 5/2012 | Kurs | H02J 50/70 |
| | | | 320/108 |
| 2016/0197522 A1* | 7/2016 | Zeine | H02J 5/005 |
| | | | 307/104 |
| 2017/0085112 A1* | 3/2017 | Leabman | H02J 50/90 |
| 2017/0201130 A1* | 7/2017 | Park | H02J 50/90 |

\* cited by examiner

WIRELESS CHARGING MANAGEMENT SYSTEM AND WIRELESS POWER TRANSMITTING TERMINAL

CROSS REFERENCE TO RELATED APPLICATION

The present application claims the priority of the Chinese application No. 201710340208.1 with the title of "WIRELESS CHARGING MANAGEMENT SYSTEM AND WIRELESS POWER TRANSMITTING TERMINAL" filed on May 15, 2017, the entire contents of which are incorporated herein by reference.

TECHNICAL FIELD

The present disclosure relates to the field of the internet of things and wireless charging, and in particular, to a wireless charging management system and a wireless power transmitting terminal.

BACKGROUND

As wireless charging technology is becoming more mature, at present, wireless charging devices have been arranged in some airports, stations and other public places for users' needs. However, such way of arrangement is the same as that of wired charging devices and cannot maximize the advantages and characteristics of the wireless charging devices.

SUMMARY

In view of this, the present disclosure provides a wireless charging management system and a wireless power transmitting terminal so as to facilitate users to use a wireless charging device in a shared manner based on the mobile internet.

In a first aspect of the present disclosure, a wireless charging management system is provided which comprises:

a plurality of wireless power transmitting terminals disposed at different geographical positions, adapted to perform charging in a wireless manner and configured to report a state information to a predetermined address;

at least one first client terminal adapted to send a first request for acquiring the information of the wireless power transmitting terminal; and a server configured to acquire position information and state information of the plurality of wireless power transmitting terminals, send the position information and the state information of at least part of the wireless power transmitting terminals to a corresponding client terminal in response to the first request and send an enable instruction to a corresponding wireless power transmitting terminal in response to a second request, wherein the second request comprises an identifier of the wireless power transmitting terminal, wherein the wireless power transmitting terminal is adapted to enter a power transmitting state in response to the enable instruction.

Further, the wireless power transmitting terminal is configured to send a updated state information to the server after detecting its decoupling from the wireless power receiving terminal; and the server is configured to calculate a usage time of the wireless power transmitting terminal according to the time at which the updated state information is received and the time at which the enable instruction is sent.

Further, the wireless power transmitting terminal is configured to acquire an identifier and charging information of a coupled wireless power receiving terminal to report to the server, wherein the charging information comprises a charging time and/or a charging capacity of the wireless power receiving terminal;

the server is configured to associate the charging information with a client terminal identifier corresponding to an identifier of the wireless power receiving terminal; and wherein the server is configured to store a correspondence between the client terminal identifier and the identifier of the wireless power receiving terminal.

Further, the wireless power transmitting terminal is configured to acquire a client terminal identifier and charging information corresponding to a coupled wireless power receiving terminal to report to the server, wherein the charging information comprises a charging time and/or a charging capacity of the wireless power receiving terminal; and wherein, the client terminal identifier is sent by the client terminal to the wireless power transmitting terminal through a communication connection.

Further, the wireless power transmitting terminal is adapted to simultaneously couple with a plurality of wireless power receiving terminals for wirelessly charging the wireless power receiving terminals; and the client terminal is adapted to acquire charging information of at least one corresponding wireless power receiving terminal and associate it with a client terminal identifier to report to the server, wherein the charging information comprises a charging time and/or a charging capacity of the wireless power receiving terminal.

Further, the wireless power receiving terminal is arranged in the first client terminal; or the wireless power receiving terminal is configured to be connected to the first client terminal through a charging interface, wherein the first client terminal acquires charging information of the wireless power receiving terminal through the charging interface; or the wireless power receiving terminal is configured to be separated from the first client terminal and the first client terminal acquires the charging information of the wireless power receiving terminal through a wireless communication connection.

Further, the server is configured to perform billing according to the charging information.

Further, the position information is registered to the sever by a second client terminal by logging into the server; or the position information is acquired by the wireless power transmitting terminal through a satellite positioning device and is uploaded to the server.

Further, the first client terminal is configured to acquire an identifier of the wireless power transmitting terminal through a wireless interface or an optical interface and send the second request.

Further, the server is configured to feed abnormal information back to the first client terminal that sends the second request when the state of the wireless power transmitting terminal corresponding to the second request is abnormal.

Further, the client terminal is configured to acquire an identifier of the wireless power transmitting terminal through a wireless interface or an optical interface and send the second request; and the server is configured to send the enable instruction to the client terminal that sends the second request, wherein the enable instruction is forwarded from the client terminal to the wireless power transmitting terminal through a wireless interface.

Further, the wireless power transmitting terminal is further configured to update the state information to the server after detecting its decoupling from a wireless power receiving terminal, and enter a sleep mode automatically or in response to a turn-off instruction from the server.

Further, the first request comprises the position information of the first client terminal, and the server is configured to push the position information related trader information to the first client terminal.

In a second aspect of the present disclosure, a wireless power transmitting terminal is provided which comprises:
 a wireless power transmitting circuit;
 a communication device; and
 a processor configured to perform the following steps:
 reporting a state information to a predetermined address; and
 entering a power transmitting state in response to an enable instruction from the server.

Further, the processor is further configured to update the state information to the predetermined address after detecting that the wireless power transmitting circuit is decoupled from a wireless power receiving terminal.

Further, the processor is further configured to acquire an identifier and charging information of a coupled wireless power receiving terminal through the wireless power transmitting circuit to report to the server, wherein the charging information comprises a charging time and/or a charging capacity of the wireless power receiving terminal.

Further, the wireless power transmitting terminal further comprises:
 a satellite positioning device configured to acquire position information of the wireless power transmitting terminal; and
 the processor is configured to acquire and upload the position information to the server.

Further, the wireless power transmitting terminal is provided with a computer-readable graphic code and/or a wireless communication device so that the identifier of the wireless power transmitting terminal can be identified in a machine-readable manner.

Further, the processor is further configured to update the state information to the server after detecting that the wireless power transmitting circuit is decoupled from a wireless power receiving terminal, and enter a sleep mode automatically or in response to a turn-off instruction from the server.

By using the server to manage a plurality of wireless power transmitting terminals distributed at different geological positions, the user could obtain the position information and state information of the wireless power transmitting terminals through the client terminal; and at the meanwhile, the wireless power transmitting terminal may operate in response to the control of the server so that the user could use the wireless charging devices conveniently in a shared manner.

DETAILED DISCLOSURE

Several embodiments of the present disclosure will be described in detail below with reference to the accompanying drawings, but the present disclosure is not limited to these embodiments. The present disclosure covers any alternatives, modifications, equivalent methods and schemes that are made in the nature and scope of the present disclosure. In order to give the public a thorough understanding of the present disclosure, specific details are described in detail in the following embodiments of the present disclosure, and the present disclosure can be fully understood by those skilled in the art without the description of these details.

The term "comprise" used in the claims should not be interpreted as limitation to the device listed thereafter. It does not exclude other components or steps. Therefore, the scope of the expression "an apparatus comprising devices A and B" should not be limited to the apparatus comprising only components A and B. It means that the relevant components of the apparatus are A and B with respect to the present disclosure.

Moreover, the terms first, second, third and the like in the description and claims are used for distinguishing between similar elements and not necessarily for describing a sequential or chronological order. It should be understood that such terms so used are interchangeable under appropriate circumstances and the embodiments of the present disclosure described herein can operate in other sequences than those described or illustrated herein.

Figure 1:
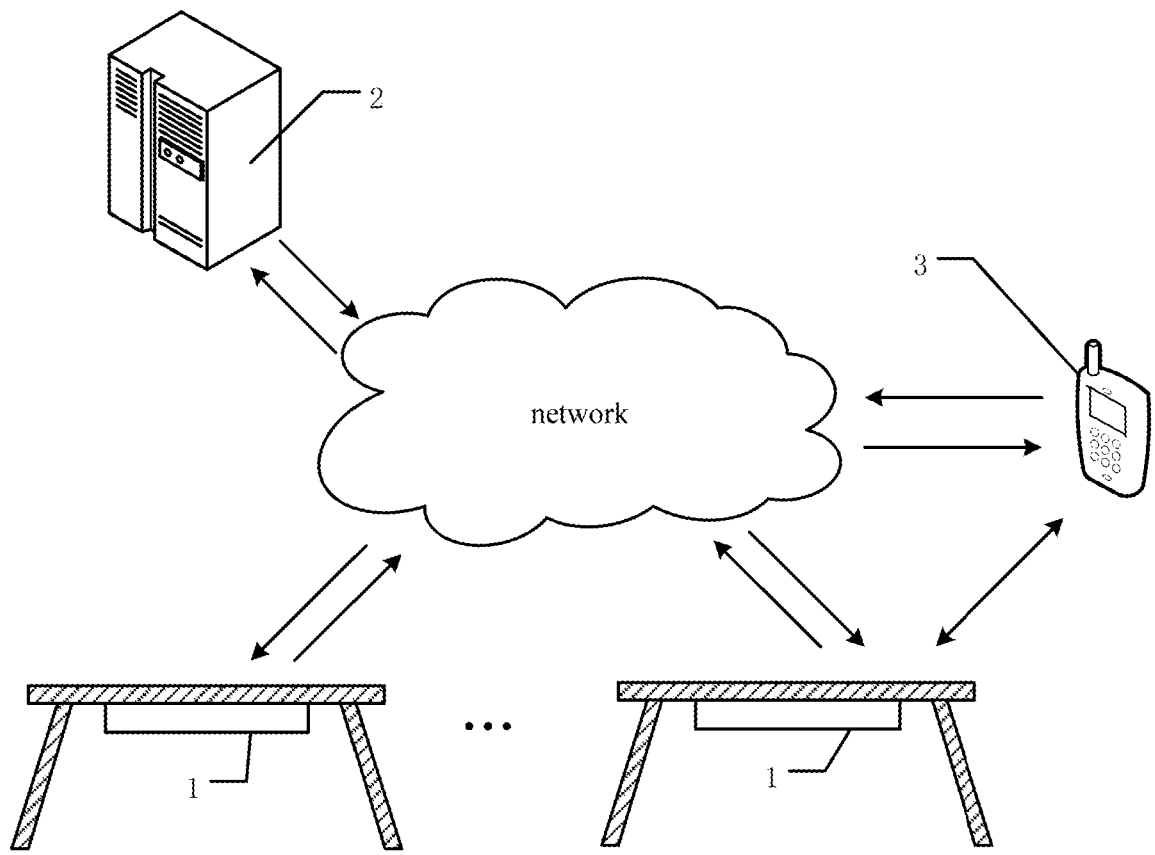
FIG. 1 is a schematic diagram of a wireless charging management system according to an embodiment of the present disclosure.
Figure 2:
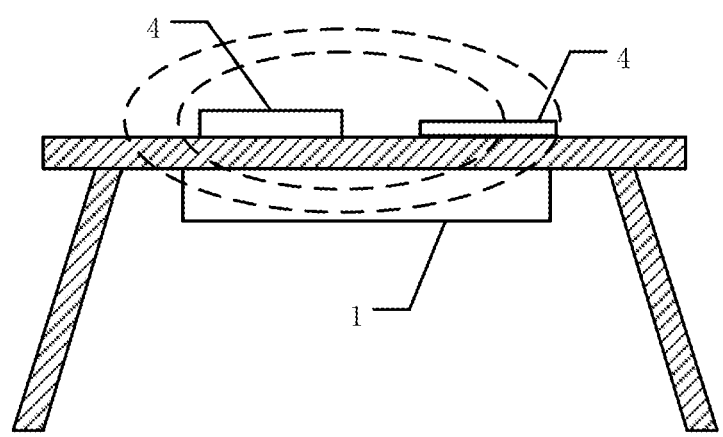
FIG. 2 is a schematic diagram of an arrangement of a wireless power transmitting terminal and a wireless power receiving terminal according to an embodiment of the present disclosure.

FIG. 1 is a schematic diagram of a wireless charging management system according to an embodiment of the present disclosure. As shown in FIG. 1, the wireless charging management system of this embodiment comprises a plurality of wireless power transmitting terminals 1, a server 2 and at least one first client terminal 3 which can communicate with each other over a network. The network can be any private network or public internet. At the meanwhile, a terminal device provided with the first client terminal 3 can also conduct one-way or two-way end-to-end communication through an optical interface (e.g., by scanning a two-dimensional code) or a short-range wireless communication interface (e.g., Bluetooth, local area network or infrared). The wireless power transmitting terminals 1 can be distributed at different geographical positions for being used by the users in a shared manner. The wireless power transmitting terminal 1 is adapted to wirelessly transmit power to wirelessly power the coupled wireless power receiving terminal. The wireless power transmitting terminal 1 is preferably a magnetic resonance type wireless power transmitting apparatus as shown in FIGS. 1 and 2 and is adapted to couple with a plurality of wireless power receiving terminals at a large distance for charging the wireless power receiving terminals. This enables the wireless power transmitting terminal 1 to be installed under the desk or integrated and received inside the desk, and to be controlled to simultaneously charge one or more devices with the wireless power receiving terminal 4 above the desktop. This is suitable for consumer places such as restaurants and cafes, which allows the users to freely charge their terminal devices in a shared manner without being restricted by the interface and the charging line while they consume. There are many different configurations for the wireless power receiving terminal. In an application scenario, the wireless power receiving terminal can be set inside the client terminal 3. In another application scenario, the wireless power receiving terminal can also be set outside the client terminal 3 as an accessory component and is connected to the client terminal 3 through a universal interface of the client terminal 3. The wireless power receiving terminal, when set outside, can be formed as a mobile phone case for user's private use. It can also be set in the form of a charging board, which is more suitable for being used by the users in a shared manner.

The server 2 may comprise a system of one or more computers connected to the client terminal 3 and the wireless power transmitting terminal 1 through a wired or wireless communication network. The server 2 stores in advance the position information of each of the wireless power transmitting terminals 1.

The wireless power transmitting terminal 1 is configured to report state information to the server 2 or other predetermined address periodically or in response to an external instruction. The state information may indicate whether the wireless power transmitting terminal 1 is in an idle state, a charging state or an abnormal state.

Figure 3:
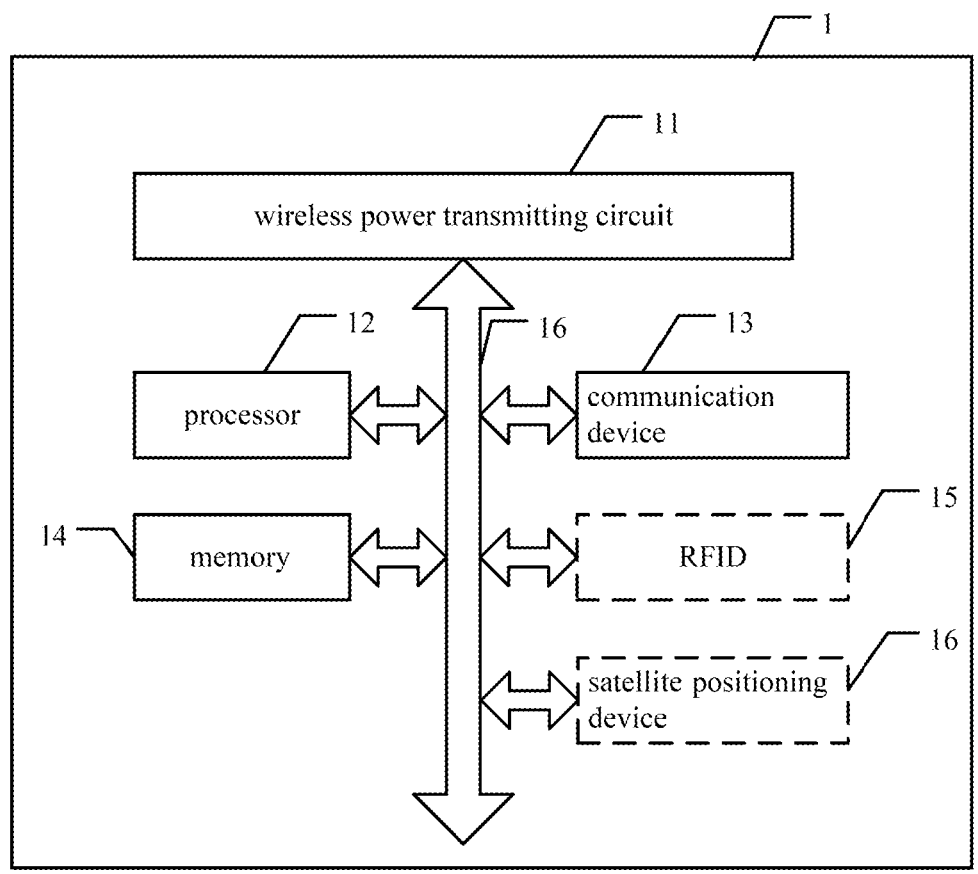
FIG. 3 is a structural block diagram of a wireless power transmitting terminal according to an embodiment of the present disclosure.

FIG. 3 is a structural block diagram of a wireless power transmitting terminal 1 according to an embodiment of the present disclosure. As shown in FIG. 3, the wireless power transmitting terminal 1 of the embodiment of the present disclosure comprises a wireless power transmitting circuit 11, a processor 12, a communication device 13 and a memory 14. The wireless power transmitting circuit 11 is configured to wirelessly transmit power to deliver energy to a coupled wireless power receiving terminal. The structure of the wireless power transmitting circuit 11 of this embodiment can be implemented by using any existing circuit structure in the prior art. In one embodiment, the wireless power transmitting circuit 11 is a magnetic resonance type wireless power transmitting circuit which transmits power to the wireless power receiving terminal by coupling with the wireless power receiving terminal based on magnetic resonance. The wireless power transmitting circuit 11, the processor 12, the communication device 13 and the memory 14 are connected through one or more buses 16. The memory 14 is adapted to store processor-executable instructions. The processor 12 is configured to execute the executable instructions to control the wireless power transmitting circuit 11 and the communication device 13 to operate and to perform information exchange. The communication device 13 may be a wired or wireless communication device and accesses to the private network or public internet through Ethernet or wireless LAN or mobile data communication network.

Figure 4:
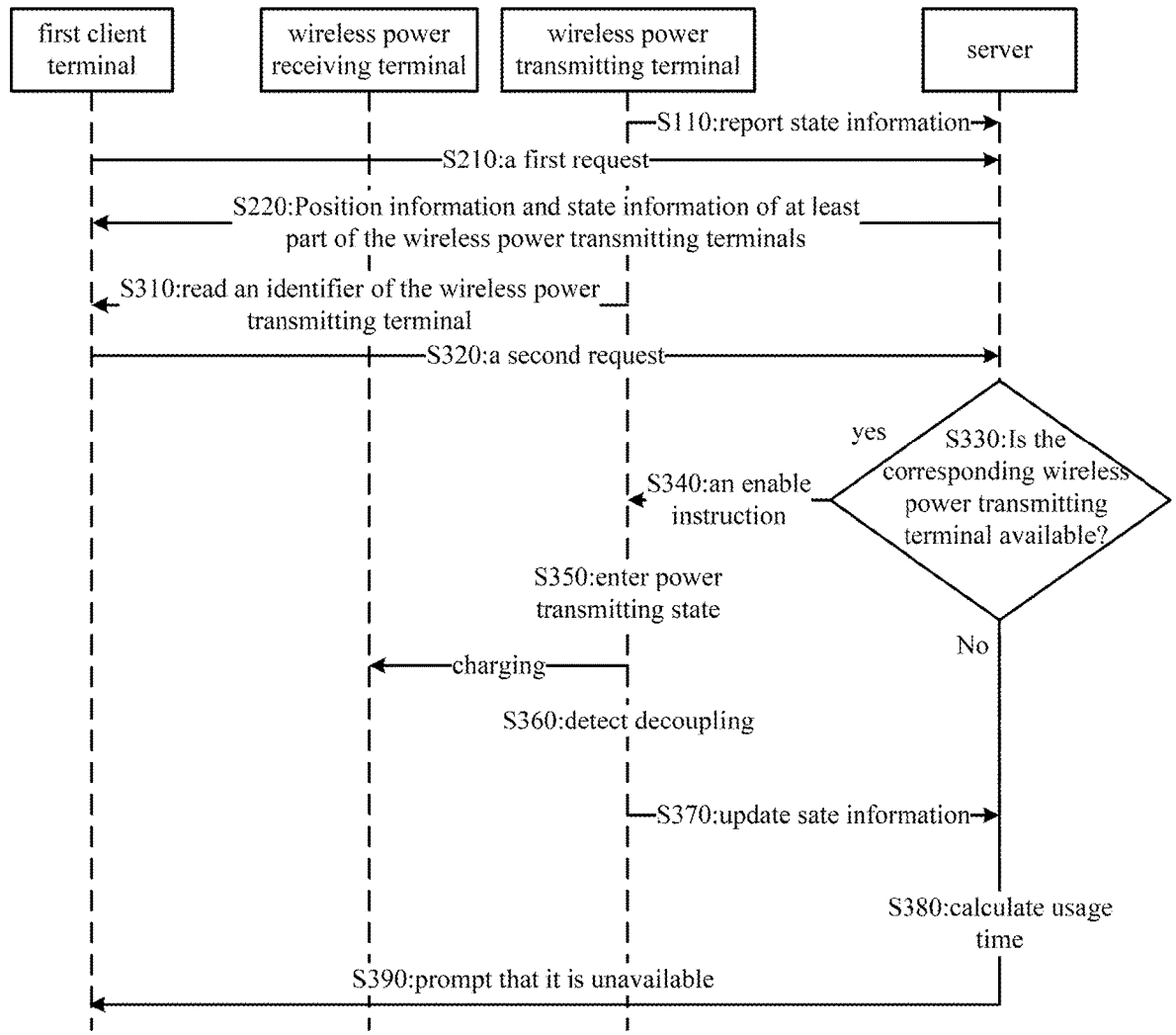
FIG. 4 is a control flowchart of a wireless charging management system according to a first embodiment of the present disclosure.

FIG. 4 is a control flowchart of a wireless charging management system according to a first embodiment of the present disclosure. As shown in FIG. 4, the control flow comprises three separate stages, i.e., stage S1 in which the server 2 collects position information and state information of the wireless power transmitting terminals 1 distributed at different positions; stage S2 in which the first client terminal 3 acquires the information of at least part of the wireless power transmitting terminals 1 by interacting with the server 2, and stage 3 in which the first client terminal 3 finds the wireless power transmitting terminal 1 that can be used in a shared manner according to the acquired information and requests the use of the wireless power transmitting terminal 1 from the server 1, the wireless power transmitting terminal 1 is coupled to the first client terminal 3 or a device associated therewith to perform charging therefor and the server 2 counts charging information.

Figure 5:
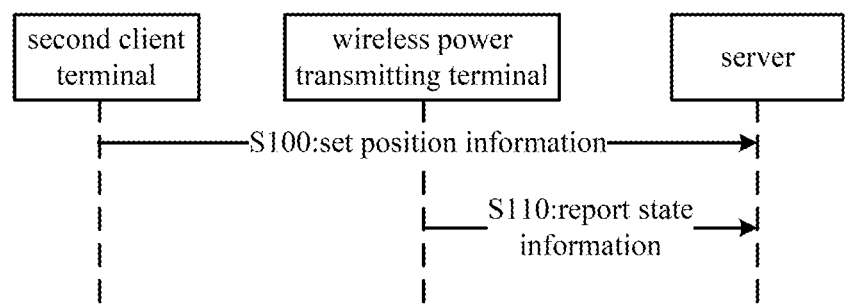
FIG. 5 is a flowchart of acquiring position information and state information by a server according to an embodiment of the present disclosure.

As described above, the wireless power transmitting terminal 1 is configured to report the state information to the server 1, whereby the server 2 can acquire the state of each of the wireless power transmitting terminals 1 in time. The position information can be uploaded to the server 2 in different ways. In one embodiment, the position information of the wireless power transmitting terminal 1 is uploaded to the server 2 through a second client terminal. The second client terminal may be a general-purpose data processing device adapted to execute predetermined program instructions, such as a smart phone, a tablet computer, a wearable device or a desktop computer. The way of uploading position information can be implemented by using various existing technologies. For example, the second client terminal may select the position of the wireless power transmitting terminal 1 on the map through a webpage-based application provided by the server 2 and input and upload the corresponding position information and the corresponding identifier of the wireless power transmitting terminal for the server 2 to bind and store. The identifier of the wireless power transmitting terminal can be obtained by scanning a two-dimensional code or reading a radio frequency identification (RFID) tag set in the wireless power transmitting terminal, or can also be obtained through the communication with the wireless power transmitting terminal 1 via a short distance wireless communication interface (e.g., Bluetooth, wireless LAN). For another example, the second client terminal may acquire the position information of the second client terminal based on a dedicated application and upload the position information to the server 2 as the position information of the wireless power transmitting terminal 1. Thus, as shown in FIG. 5, at step S100, the second client terminal sets the position information of the wireless power transmitting terminal 1 to the server. The wireless power transmitting terminal 1 then periodically reports its own state information at step S110. Using such setting way to upload position information has a low cost.

Figure 6:
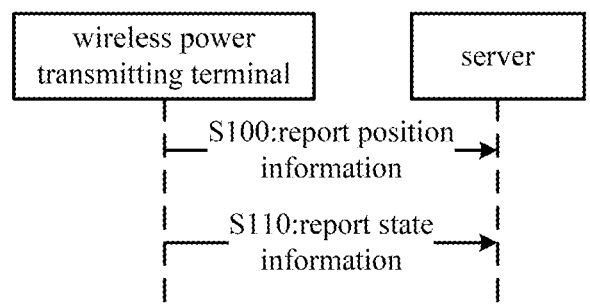
FIG. 6 is a flowchart of acquiring position information and state information by a server according to another embodiment of the present disclosure.

In another embodiment, the wireless power transmitting terminal 1 is provided with a satellite positioning device 16 (such as a GPS system positioning device or a Beidou system positioning device) so that the wireless power transmitting terminal 1 has a function of locating its own position. Thus, as shown in FIG. 6, the wireless power transmitting terminal 1 may report its own position information to the server 2 when being initialized at step S100 and then periodically reports its own state information at step S110. At the meanwhile, the wireless power transmitting terminal 1 may also update its own position information periodically or in response to an external instruction. Providing the satellite positioning device 16 can make the reporting of the position information of the wireless power transmitting terminal 1 more automatic. This is applicable to occasions where the wireless power transmitting terminal 1 is constantly moving, for example, where the wireless power transmitting terminal 1 is provided on a bus.

For stage S2, it may comprise the following steps:

At step S210, the first client terminal 3 sends a first request to the server 2 for acquiring information related to the wireless power transmitting terminal 1.

The first request may comprise current position information of the first client terminal 3 or other condition information (e.g., designated shopping area information or designated position information).

At step S220, the server 2 sends position information and state information of at least part of the wireless power transmitting terminals 1 to the first client 3 that sends the first request.

As stated above, the at least part of the wireless power transmitting terminals are those corresponding to the information comprised in the first request. For example, the server 2 may send position information and state information of all wireless power transmitting terminals within a radius of 1 km of the current position of the first client terminal 3. The first client terminal 3 may further filter according to the state information to display the user wireless power transmitter in idle state. For another example, the server 2 may send position information and state information of all wireless power transmitting terminals corresponding to the business circle information comprised in the first request. The first client terminal 3 may further filter according to the state information to display the user wireless power transmitting terminal in idle state. For another example, the server 2 may send position information and state information of all wireless power transmitting terminals within a certain radius range corresponding to the position information comprised in the first request. The first client terminal 3 may further filter according to the state information to display the user wireless power transmitting terminals in idle state.

In one embodiment, the server 2 may also send additional information to the first client terminal 3 at the same time. The additional information may carry descriptive information of the position of the wireless power transmitting terminal 1 (e.g., in a certain cafe, etc.), usage condition information (e.g., can only be used by performing purchases in a store or may be used for free or may be used by being charged according to a predetermined charging standard, etc.)

In one embodiment, the server 2 may also send merchant information related to the position information in the first request to the first client terminal 3 at the same time so as to provide the user with richer information and provide the merchant with certain advertisement service at the same time.

Thus, the user can find the nearest or most convenient wireless power transmitting terminal 1 to perform charging according to the guidance of the first client terminal 3.

For stage S3, the following steps are specifically comprised:

At step S310, the first client terminal 3 reads the identifier of the wireless power transmitting terminal. The identifier of the wireless power transmitting terminal 1 can be stored in the wireless power transmitting circuit or can also be stored in the memory 14.

Optionally, the first client terminal 3 acquires the identifier of the corresponding wireless power transmitting terminal 1 by scanning a two-dimensional code provided on the desktop or the housing of the wireless power transmitting terminal.

Optionally, when a radio frequency tag is set in the wireless power transmitting terminal 1, the first client terminal 3 may also acquire the identifier of the corresponding wireless power transmitting terminal 1 by reading the radio frequency tag.

Optionally, when the communication device 13 of the wireless power transmitting terminal 1 has the function of short-range direct communication such as Bluetooth, infrared or wireless local area network, the first client terminal 3 can acquire the identifier of the wireless power transmitting terminal 1 by communicating with the communication device 13.

At step S320, the first client terminal 3 sends a second request to the server 2. The second request comprises the identifier of a specific wireless power transmitting terminal 1, that is, the identifier of the wireless power transmitting terminal acquired in step S310. The second request is for requesting the use of the wireless power transmitting terminal from the server 2.

At step S330, after receiving the second request, the server 2 determines whether the wireless power transmitting terminal 1 corresponding to the second request is available. If it is available, the process goes to step S340, otherwise, it goes to step S390.

The server 2 stores the state information of all the wireless power transmitting terminals 1 and can determine whether the wireless power transmitting terminal corresponding to the second request is idle and available according to the stored state information.

At step S340, the server 2 sends an enable instruction to the wireless power transmitting terminal 1 corresponding to the second request. The enable instruction is used to control the wireless power transmitting terminal 1 to enter power transmitting state.

In one embodiment, there can be a step of authenticating the second request before the server sending the enable instruction so that only the request issued by the authorized first client terminal (e.g., a registered user) may obtain a response.

At step S350, the wireless power transmitting terminal 1 enters the power transmitting state in response to the enable instruction.

The wireless power transmitting terminal 1 is in a sleep or low power consumption state when being idle, which can on one hand reduce the power consumption of the wireless power transmitting terminal land on the other hand make the wireless power transmitting terminal 1 be used only if the wireless power transmitting terminal 1 receives the enable instruction from the server, so as to manage the usage rights of the wireless power transmitting terminal 1. At the meanwhile, the wireless power transmitting terminal 1 enters into sleep after waiting for a predetermined time after detecting that all the wireless power receiving terminals are decoupled or the server sends a sleep instruction to control the wireless power transmitting terminal to enter into sleep according to the state information reported by the wireless power transmitting terminal 1.

The wireless power transmitting terminal 1 can be coupled with the wireless power receiving terminal for wireless charging the wireless power receiving terminal after entering the power transmitting state. The wireless power receiving terminal is decoupled from the wireless power transmitting terminal 1 after the charging is completed. During the charging process, the wireless power transmitting terminal 1 maintains the detection of the operation state. At step S360, the wireless power transmitting circuit 11 detects the decoupling from the wireless power receiving terminal and this state can be detected by the processor 13.

An step S370, the wireless power transmitting terminal 1 updates the state information to the server 2 through the communication connection with the server 2.

In this embodiment, at step S380, the server calculates the usage time of the wireless power transmitting terminal according to the time at which the updated state information is received and the time at which the enable instruction is sent.

Further, the server may perform billing according to the calculated usage time and associate the billing information with the client terminal that sends the second request.

The wireless charging management system of the present embodiment realizes the shared use of the wireless power transmitting terminal in a relatively simple manner. It can further realize data statistics and billing for the usage, which is simple and low cost.

When the server determines at step S330 that the wireless power transmitting terminal 1 corresponding to the second request is unavailable, the process goes to step S390 which prompts the first client terminal 3 that the requested wireless power transmitting terminal 1 is unavailable. Thus, the user may seek to use other wireless power transmitting terminal.

Figure 7:
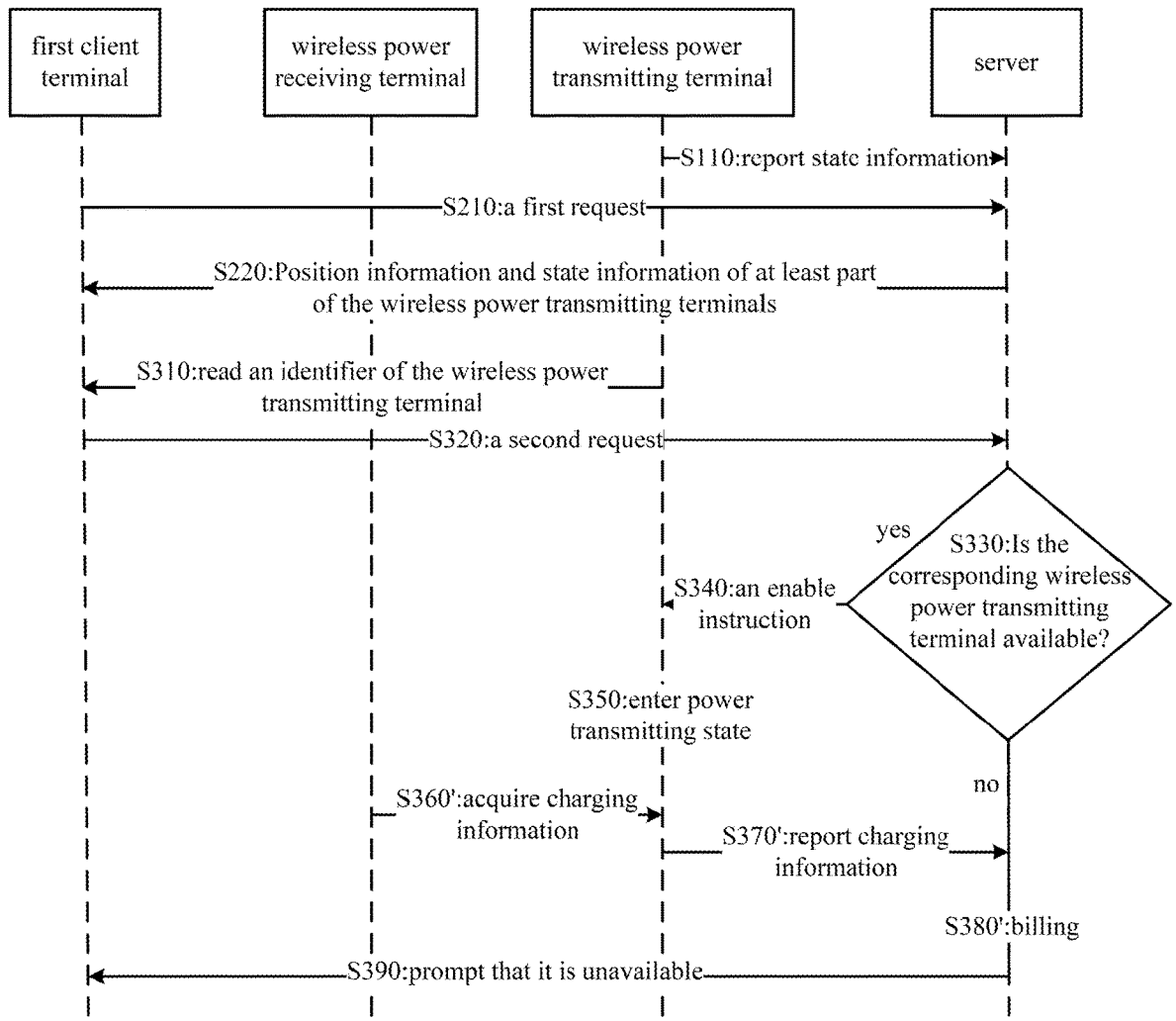
FIG. 7 is a control flowchart of a wireless charging management system according to a second embodiment of the present disclosure.

FIG. 7 is a control flowchart of a wireless charging management system according to a second embodiment of the present disclosure. As shown in FIG. 7, steps S110-S350 are the same as those in FIG. 4 and will not be repeated here. At step S350, the wireless power transmitting terminal 1 can be coupled to the wireless power receiving terminal for wirelessly charging the wireless power receiving terminal immediately after entering the power transmitting state. In the charging process, although the wireless power transmitting terminal 1 can record the state of its own output power, the wireless power transmitting terminal 1, when being coupled to the multiple wireless power receiving terminals, cannot obtain charging information of each of the multiple wireless power receiving terminals by monitoring its own circuit parameters. Therefore, at step S360', the wireless power transmitting terminal 1 acquires charging parameters of the wireless power receiving terminal through the communication with the wireless power receiving terminal and then acquires the charging information according to the charging parameters and also acquires the client terminal identifier corresponding to the wireless power receiving terminal at the meanwhile. The charging parameters may comprise, for example, an output voltage and an output current of the wireless power receiving terminal, and the like. The wireless power transmitting terminal may calculate according to the charging parameters in order to obtain a charging time and/or a charging capacity of each of the coupled wireless power receiving terminals.

At step S370', the wireless power transmitting terminal 1 reports the collected charging information and the identifier of the wireless power receiving terminal to the server 2 through the communication connection with the server 2.

Figure 9:
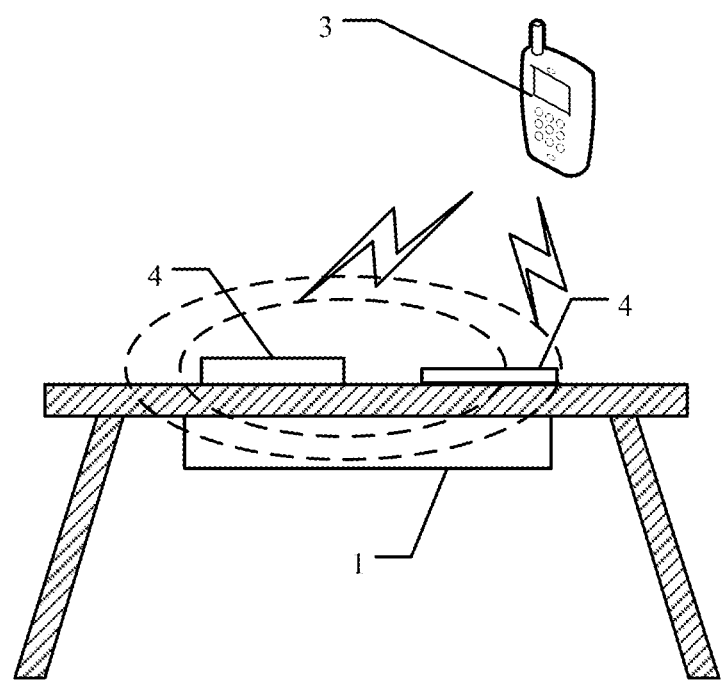
FIG. 9 is a schematic diagram of an arrangement of a wireless power transmitting terminal and a wireless power receiving terminal according to an embodiment of the present disclosure.

That is, at step S360' and step S370', what the wireless power transmitting terminal 1 acquires is the identifier of the wireless power receiving terminal. This may enable one first client terminal 3 to simultaneously request to wirelessly charging multiple different wireless power receiving terminals, that is, requesting the use of the wireless power transmitting terminal 1 by the first client terminal 3 and performing authentication and payment, for example, using the wireless power transmitting terminal 1 to wirelessly charging at least one other device separated from the first client terminal 3. For example, the user can use a mobile phone as the client terminal and request charging the mobile phone and a tablet computer used by him/her at the same time. For another example, the user can use the mobile phone as the client terminal and request charging his tablet computer and laptop computer at the same time without charging the mobile phone (this scenario is shown in FIG. 9). The costs incurred are calculated under the same account. In the present embodiment, the identifier of each of the wireless power receiving terminals is acquired and uploaded to the server 2 by the wireless power transmitting terminal 1. The server 2 stores in advance the correspondence between the client terminal identifier and the identifier of the wireless power receiving terminal. This can be obtained by the first client terminal 3 logging into the server 2 for its registration in advance. Since the wireless power receiving terminal to be charged is not connected to the first client terminal 3, the identifier of the first client terminal 3 cannot be read. Therefore, in the present embodiment, the server is configured to associate the charging information with the client terminal identifier corresponding to identifier of the wireless power receiving terminal. As a result, billing can be effectively performed, and it is also conducive to the rights management, which prevents unauthorized access of the wireless power receiving terminal that could result in user loss. Therefore, in the scenario where the user uses multiple electronic devices, the user can scan the code to request the use of the wireless power transmitting terminal 1 through one first client terminal and, after obtaining the rights, charge multiple devices at the same time.

Thus, the charging conditions of multiple wireless power receiving terminals coupled with the wireless power transmitting terminals 1 in the system can be aggregated to the server 2. The server 2 can not only obtain the data of the power output of each of the wireless power transmitting terminals 1, but also can obtain how much electricity is charged to which first client terminals using which wireless power transmitting terminal in the system. The server 2 can perform billing for the user or conduct analysis according to these data to obtain, for example, the capacities and performances of batteries of mobile phones with different brands.

At the meanwhile, based on the wireless charging management system of the present embodiment, two different client terminals with wireless power receiving terminals are allowed to be coupled to one wireless power transmitting terminal at the same time and are billed respectively. As a result, a fine management of wireless charging is achieved.

Figure 8:
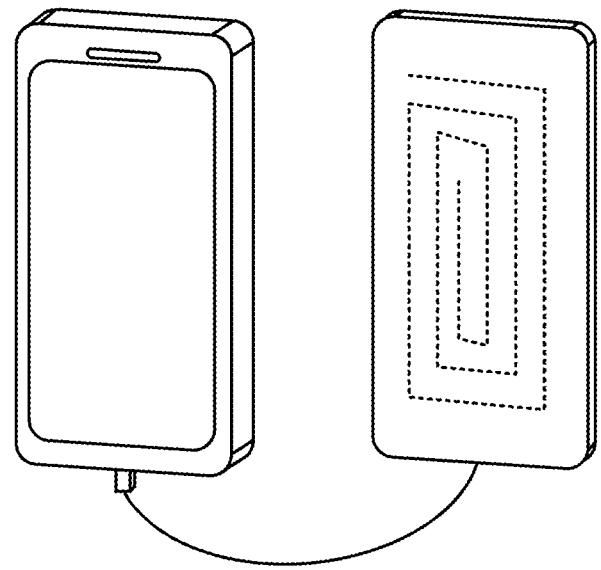
FIG. 8 is a schematic diagram of a connection between a wireless power receiving terminal and a terminal device according to an embodiment of the present disclosure.

At the meanwhile, a terminal device that does not have a built-in wireless power receiving terminal can also achieve wireless charging function by connecting to an external wireless power receiving terminal, as shown in FIG. 8. The wireless power receiving terminal can be integrated with a protective cover of the terminal device, which makes the terminal device achieve wireless charging function when mounted with the protective cover. The wireless power receiving terminal can also be formed as a separate panel and configured with a plurality of different charging interfaces with which the terminal devices are connected to achieve wireless charging function.

Moreover, this also enables multiple users to use one wireless power transmitting terminal 1 in a shared manner at the same time to charge multiple devices without causing a billing error.

Figures 10, 11:
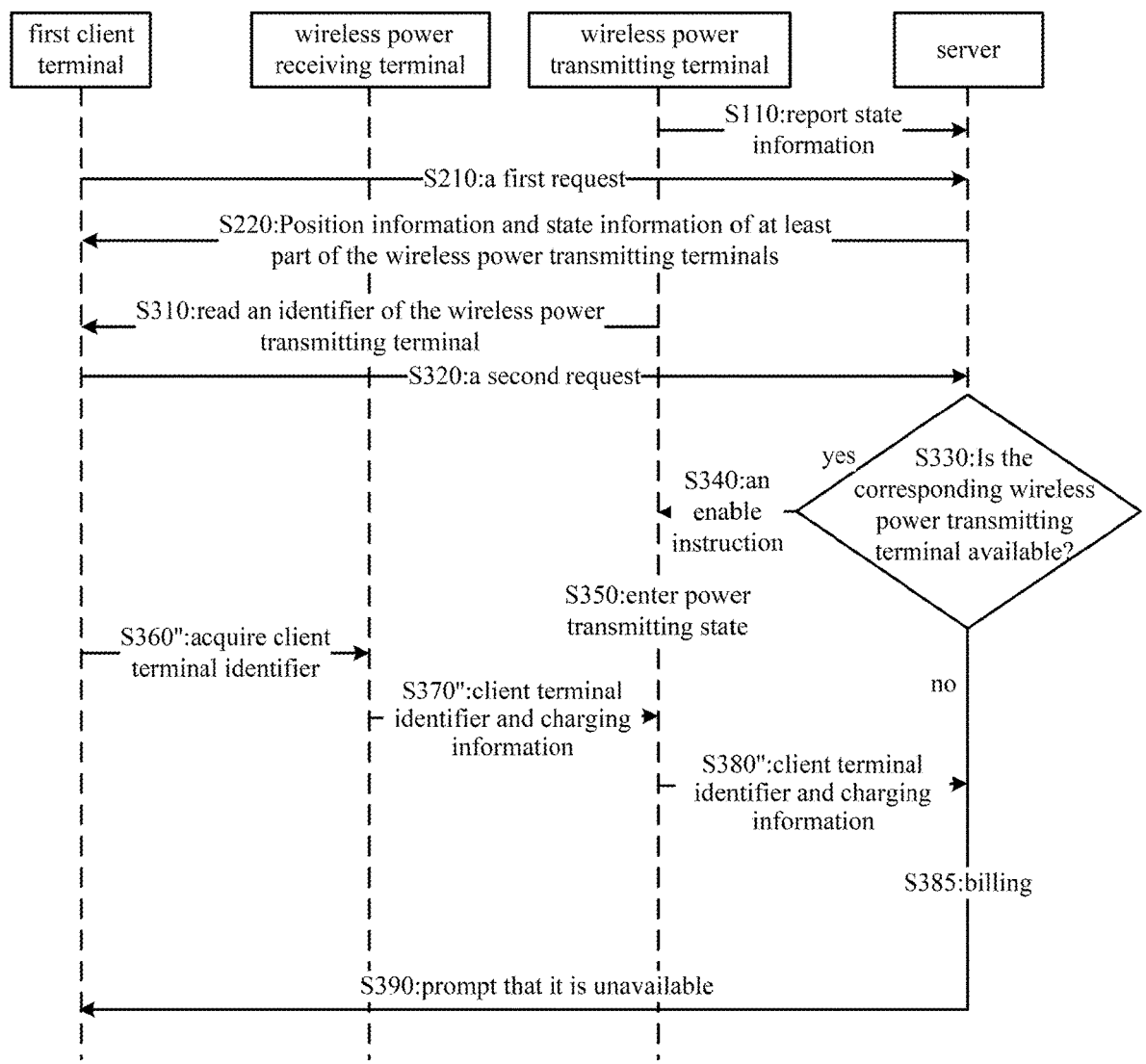
FIG. 10 is a schematic diagram of a correspondence between a client terminal identifier and an identifier of a wireless power receiving terminal stored in the server according to an embodiment of the present disclosure.
FIG. 11 is a control flowchart of a wireless charging management system according to a third embodiment of the present disclosure.

The correspondence between the client terminal identifier and the identifier of the wireless power receiving terminal stored in the server is shown in FIG. 10. In FIG. 10, the client terminal identifier User10010 stored in the server 2 is bound with three different wireless power receiving terminals, Jsd1291934, Jsd1290001 and Jsd1297856. At the meanwhile, the server 2 also stores a billing account corresponding to each client terminal identifier. This enables the system to automatically charge after billing, which improves automation level.

FIG. 11 is a control flowchart of a wireless charging management system according to a third embodiment of the present disclosure. As shown in FIG. 11, steps S110-S350 are the same as those in FIG. 4 and will not be repeated here. At step S350, the wireless power transmitting terminal 1 can be coupled to the wireless power receiving terminal for wirelessly charging the wireless power receiving terminal immediately after entering the power transmitting state. In the present embodiment, the wireless power transmitting terminal 1 acquires the client terminal identifier from the wireless power receiving terminal or directly from the client terminal during the charging process. The present embodiment is applicable to a scenario where the wireless power receiving terminal is connected to the client terminal 3 from the outside. Since the charging interface of the existing smart device is usually also a data interface, the wireless power receiving terminal can be configured to communicate with an application responsible for wireless charging management in the client terminal 3 at step 360" after connecting to the client terminal 3 to acquire the client terminal identifier, and send the client terminal identifier and the charging information to the wireless power transmitting terminal 1 at step 370". The wireless power transmitting terminal 1 then reports the client terminal identifier and the charging information to the server 2 at step 380". The server 2 performs billing according to the client terminal identifier and the charging information at step S385.

The advantage of the present embodiment is that it does not need to register the identifier of the wireless power receiving terminal bound with the client terminal in advance in the server. It makes it possible to use the public wireless power receiving terminal for charging, which is easy to use.

Figure 12:
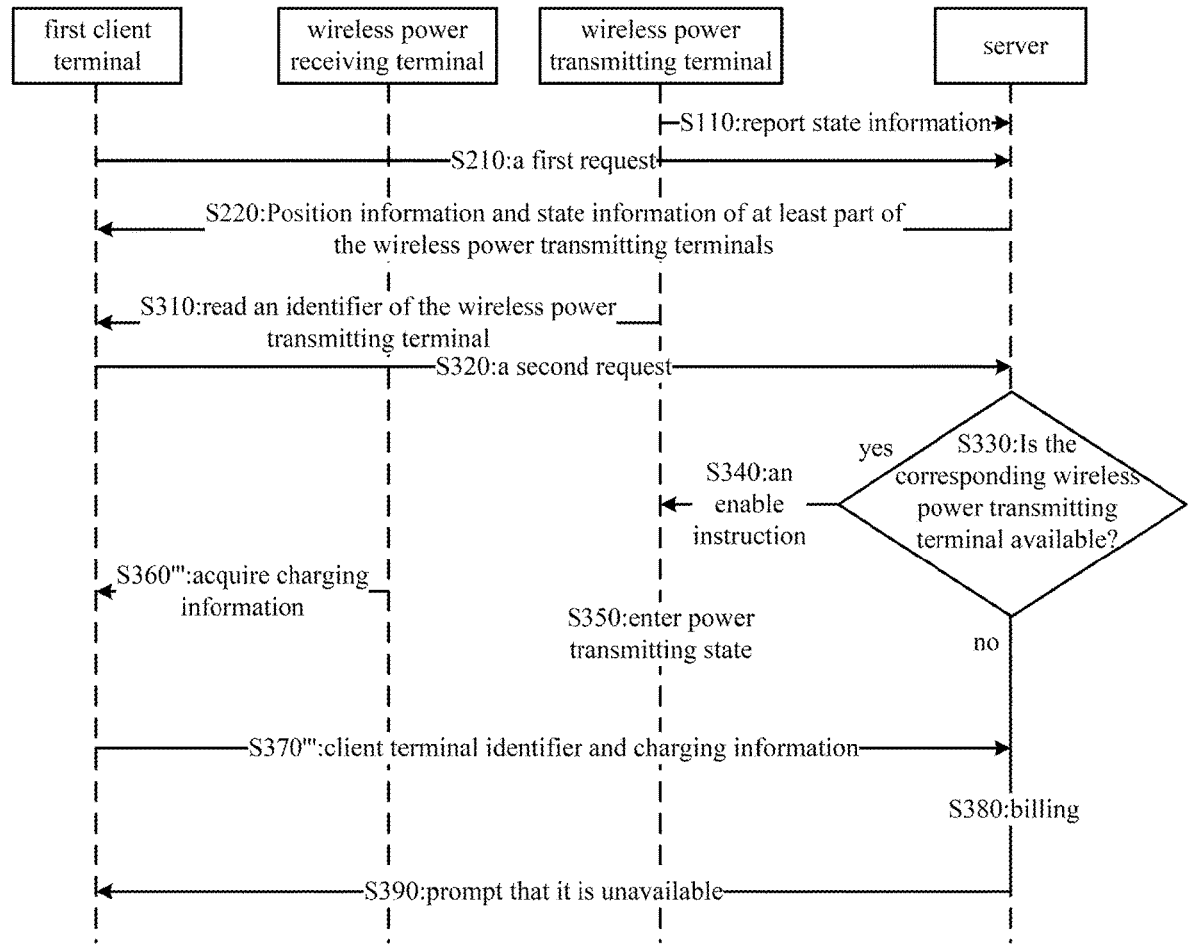
FIG. 12 is a control flowchart of a wireless charging management system according to a fourth embodiment of the present disclosure.

FIG. 12 is a control flowchart of a wireless charging management system according to a fourth embodiment of the present disclosure. The present embodiment is also applicable to a scenario where a first client terminal requests to charge a plurality of wireless power receiving terminals. As shown in FIG. 12, steps S110-S350 are the same as those in FIG. 4 and will not be repeated here. At step S360', the first client terminal 3 acquires charging information from the wireless power receiving terminal, and the first client terminal 3 associates the charging information with its own client terminal identifier to report to the server 2 at step S370'. The charging information comprises a charging time and/or a charging capacity of the wireless power receiving terminal. The way of collecting the charging information in the present embodiment requires the communication connection between the wireless energy receiving terminal and the first client terminal 3. Such connection may be a direct connection to the first client terminal 3 through a charging line as described above, or it may be a connection in a way of short-range end-to-end communication through, for example, Bluetooth, local area network, infrared, or the like. By collecting the charging information in the way as described in the present embodiment, it is not necessary to bind the wireless power receiving terminal with the first client terminal in the system, thereby improving the convenience of use, which also enables the user to charge its own terminal device by connecting the terminal device with a universal wireless power receiving terminal without affecting the accuracy of billing.

The present disclosure manages a plurality of wireless power transmitting terminals distributed at different geographic positions through a server, so that the user can obtain position information and state information of the wireless power transmitting terminal through the client terminal, and at the meanwhile, the wireless power transmitting terminal can operate in response to the control of the server, which enables the user to use the wireless charging device in a shared manner conveniently.

The above description is a description of the embodiments of the present disclosure. Various changes and modifications may be made without departing from the scope of the present disclosure. The present disclosure is presented for illustrative purposes and should not be interpreted as an exclusive description of all embodiments of the present disclosure or as limiting the scope of the present disclosure to the specific elements illustrated and described in conjunction with these embodiments. Any one or more of the individual elements of the described disclosure may be replaced by a replacement element that provides substantially similar functionality or otherwise provides a sufficient operation without any limitation. This comprises currently known replacement elements, such as those currently known to those skilled in the art, as well as the replacement elements that may be developed in the future, such as those that the skilled in the art might recognize as an alternative at the time of development.

The invention claimed is:

1. A wireless charging management system comprising:
   a plurality of wireless power transmitting terminals disposed at different geographical positions, adapted to perform charging in a wireless manner;
   at least one first client terminal; and
   a server
   wherein the server obtains position information and state information of each of the plurality of wireless power transmitting terminals, the first client terminal sends a first request to the server, the first request comprising current position information of the first client terminal, the sever sends, in response to the first request, the position information and the state information of one or more candidate wireless power transmitting terminals to the first client terminal, the one or more candidate wireless power transmitting terminals are selected from the plurality of wireless power transmitting terminals, the first client terminal selects a wireless power transmitting terminal from the one or more candidate wireless power transmitting terminals, obtains an identifier of the selected wireless power transmitting terminal, and sends a second request to the server, the second request comprises the identifier of the selected wireless power transmitting terminal, the server sends an enable instruction to the selected wireless power transmitting terminal, and the selected wireless power transmitting terminal charges the first client terminal in response to the enable instruction.

2. The wireless charging management system of claim 1, wherein the wireless power transmitting terminal is configured to send updated state information to the server after detecting its decoupling from the wireless power receiving terminal; and the server is configured to calculate a usage time of the wireless power transmitting terminal according to the time at which the updated state information is received and the time at which the enable instruction is sent.

3. The wireless charging management system of claim 1, wherein the selected wireless power transmitting terminal is configured to acquire an identifier and charging information of the coupled wireless power receiving terminal to report to the server, wherein the charging information comprises a charging time and/or a charging capacity of the wireless power receiving terminal;

the server is configured to associate the charging information with a client terminal identifier corresponding to an identifier of the wireless power receiving terminal; and wherein the server is configured to store a correspondence between the client terminal identifier and the identifier of the wireless power receiving terminal.

4. The wireless charging management system of claim 1, wherein the wireless power transmitting terminal is configured to acquire a client terminal identifier and charging information corresponding to a coupled wireless power receiving terminal to report to the server, wherein the charging information comprises a charging time and/or a charging capacity of the wireless power receiving terminal; and wherein the client terminal identifier is sent by the client terminal to the wireless power transmitting terminal through a communication connection.

5. The wireless charging management system of claim 1, wherein the wireless power transmitting terminal is adapted to simultaneously couple with a plurality of wireless power receiving terminals for wirelessly charging the wireless power receiving terminals; and the client terminal is adapted to acquire charging information of at least one corresponding wireless power receiving terminal and associate it with a client terminal identifier to report to the server, wherein the charging information comprises a charging time and/or a charging capacity of the wireless power receiving terminal.

6. The wireless charging management system of claim 2, wherein the wireless power receiving terminal is arranged in the first client terminal; or the wireless power receiving terminal is configured to be connected to the first client terminal through a charging interface, wherein the first client terminal acquires charging information of the wireless power receiving terminal through the charging interface; or the wireless power receiving terminal is configured to be separated from the first client terminal and the first client terminal acquires the charging information of the wireless power receiving terminal through a wireless communication connection.

7. The wireless charging management system of claim 2, wherein the server is configured to perform billing according to the charging information.

8. The wireless charging management system of claim 1, wherein the position information is registered to the sever by a second client terminal by logging into the server; or the position information is acquired by the wireless power transmitting terminal through a satellite positioning device and is uploaded to the server.

9. The wireless charging management system of claim 1, wherein the first client terminal is configured to acquire the identifier of the wireless power transmitting terminal through a wireless interface or an optical interface.

10. The wireless charging management system of claim 9, wherein the server is configured to feed abnormal information back to the first client terminal that sends the second request when the state of the wireless power transmitting terminal corresponding to the second request is abnormal.

11. The wireless charging management system of claim 1, wherein the client terminal is configured to acquire the identifier of the wireless power transmitting terminal through a wireless interface or an optical interface; and the server is configured to send the enable instruction to the client terminal that sends the second request, wherein the enable instruction is forwarded from the client terminal to the wireless power transmitting terminal through a wireless interface.

12. The wireless charging management system of claim 1, wherein the wireless power transmitting terminal is further configured to update the state information to the server after detecting its decoupling from a wireless power receiving terminal, and enter a sleep mode automatically or in response to a turn-off instruction from the server.

13. The wireless charging management system of claim 1, wherein the server is configured to push trader information related to the position of the first client terminal to the first client terminal.

14. The wireless charging management system of claim 1, wherein the state information of the wireless power transmitting terminal indicates whether the wireless power transmitting terminal is in an idle state, a charging state, or an abnormal state.

* * * * *